United States Patent [19]

Ohnuma

[11] 4,412,164
[45] Oct. 25, 1983

[54] LENS SYSTEM DRIVING DEVICE

[75] Inventor: Takashi Ohnuma, Yokohama, Japan

[73] Assignee: Canon Kabushiki Kaisha, Tokyo, Japan

[21] Appl. No.: 428,270

[22] Filed: Sep. 29, 1982

Related U.S. Application Data

[63] Continuation of Ser. No. 82,534, Oct. 9, 1979, abandoned.

[30] Foreign Application Priority Data

Oct. 11, 1978 [JP] Japan .............................. 53-124134

[51] Int. Cl.³ ............................................ G05B 11/18
[52] U.S. Cl. .................... 318/596; 318/597; 318/635
[58] Field of Search ....................... 318/596, 597, 635; 350/187

[56] References Cited

U.S. PATENT DOCUMENTS 3,758,838  3/1983  Wright ................................ 318/635

Primary Examiner—B. Dobeck
Attorney, Agent, or Firm—Fitzpatrick, Cella, Harper & Scinto

[57] ABSTRACT

A lens apparatus for moving one or more moving lenses of a lens system up to the end position of movement by a servomotor. The lens apparatus limits the moving speed of the moving lens or lenses to a value under a predetermined level. Also, the lens apparatus gradually reduces the moving speed as the moving lens or lenses approach the end position so that the moving lens element or elements can be stopped precisely at the end position.

2 Claims, 2 Drawing Figures

LENS SYSTEM DRIVING DEVICE

This is a continuation, of application Ser. No. 082,534, filed Oct. 9, 1979, now abandoned.

BACKGROUND OF THE INVENTION

1. Field of the Invention

The present invention relates to a lens apparatus for moving one or more moving lenses of a lens system up to the end position of its moving course by a servo-motor.

2. Description of the Prior Art

A zoom lens for TV camera comprises at least one moving lens element such as a variator and compensator movably mounted within a cam tube. In zoom lenses hitherto known, these movable lens elements are conventionally supported by a slide member such as ball bearings through the cam slots of a translation cam tube and rotation cam tube. The rotation cam tube is driven by a servo-motor through a gearing mechanism. A speed instruction signal of a predetermined level is applied to the servo-motor through a servo-amplifier so as to rotate the rotation cam tube by an amount corresponding to the signal. Thereby, the moving lenses are displaced axially to perform a zoom function.

When the moving zoom elements are shifted from a first position to a second position, according to the above described conventional method, they are moved at first at a constant speed to a predetermined position from the first position and then they are moved to the second position from the predetermined position at a converging speed gradually decreasing to zero (0) speed. The predetermined position at which the phase of lens movement is changed over from the constant speed to the diverging speed is fixed and remains unchanged for all possible moving speeds at which the moving zoom elements are moved. This involves some problems. The higher the moving speed is, the larger the mechanical inertia of a moving part is. Therefore, large mechanical vibration and noise are produced when the zoom elements being moved at a high speed is stopped suddenly at the predetermined position. Many attempts have been made to smoothly drive and stop the moving lenses in a zoom unit. One solution to this problem hitherto known and most widely employed at present is to extend the end part of the cam slot formed on the rotation cam tube in the circumferential direction of the cam tube so that the moving zoom elements may be stopped effectively even when the rotation cam tube still continues rotating. However, this solution has a disadvantage with respect to the rise time of lens movement. Since the cam slot has an extension extending in the circumferential direction, the start of lens movement is delayed and there is brought about a reverse effect. Due to the presence of the circumferential extension of the cam slot, the lenses can not be driven at once when the servo-motor starts rotating and there is produced a delay in response. This is an important drawback involved in the solution.

SUMMARY OF THE INVENTION

Accordingly, it is a general object of the present invention to solve more effectively and more completely, the above mentioned problem.

More specifically, it is an object of the invention to provide a lens driving apparatus which prevents the moving lenses from being stopped abruptly.

It is another object of the invention to provide such lens driving apparatus with which the speed of the moving lenses is limited to a value under a certain predetermined level by suitably controlling the speed instruction signal given by zoom demand or focus demand by means of a detection signal of the actual lens position.

It is a further object of the invention to provide such lens driving apparatus with which, when the moving lenses come close to a certain predetermined position in the lens moving range, the converging speed of the moving lenses is gradually reduced to prevent a sudden stop of the moving lenses.

To attain the above objects according to the invention, the speed instruction signal is introduced into a first level limiting circuit to limit the speed of the moving lenses and when the moving lenses come close to the predetermined position the level of the speed instruction signal is further limited by a second level limiting circuit in accordance with a position detection signal. Furthermore, when the moving lenses go over the predetermined position, a speed instruction signal is generated which causes the moving lenses to move in the reverse direction so that the converging speed of the moving lenses is gradually reduced to prevent an abrupt stop of the moving lenses.

Other and further objects, features and advantages of the invention will appear more fully from the following description taken in connection with the accompanying drawings.

DESCRIPTION OF THE PREFERRED EMBODIMENTS

Figure 1:
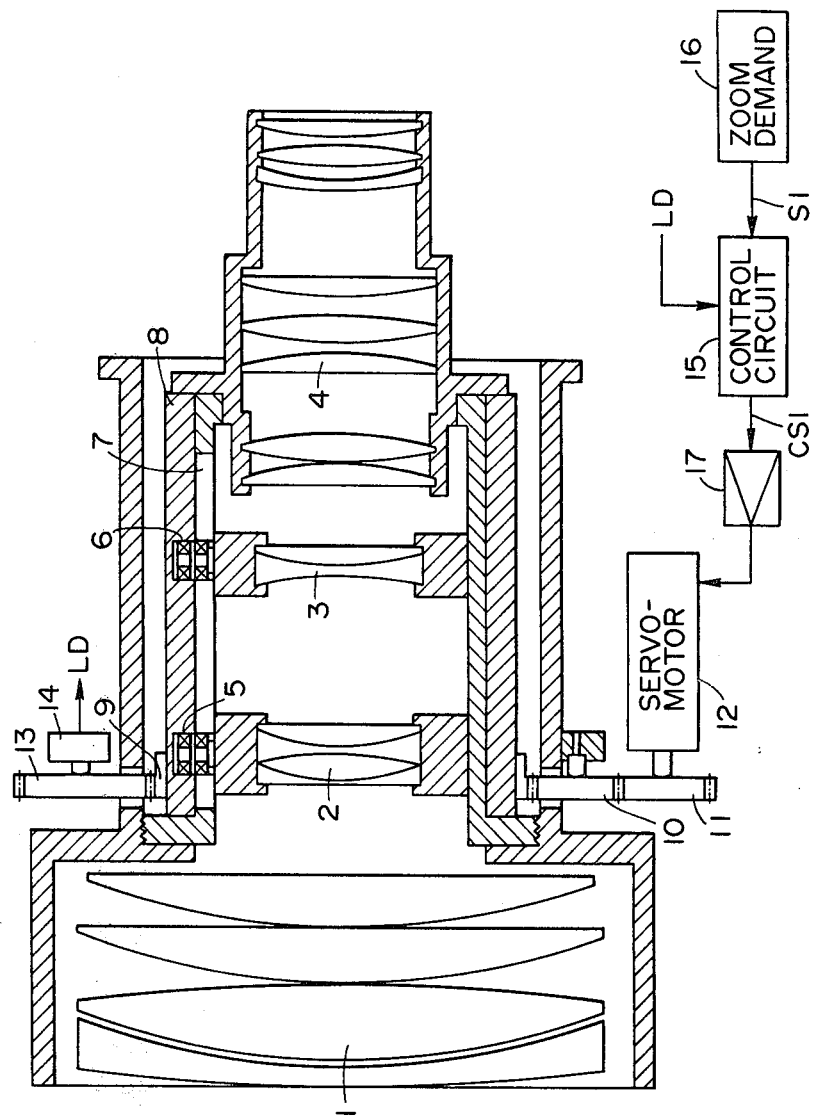
FIG. 1 shows an embodiment of lens driving apparatus according to the invention.
Figure 2:
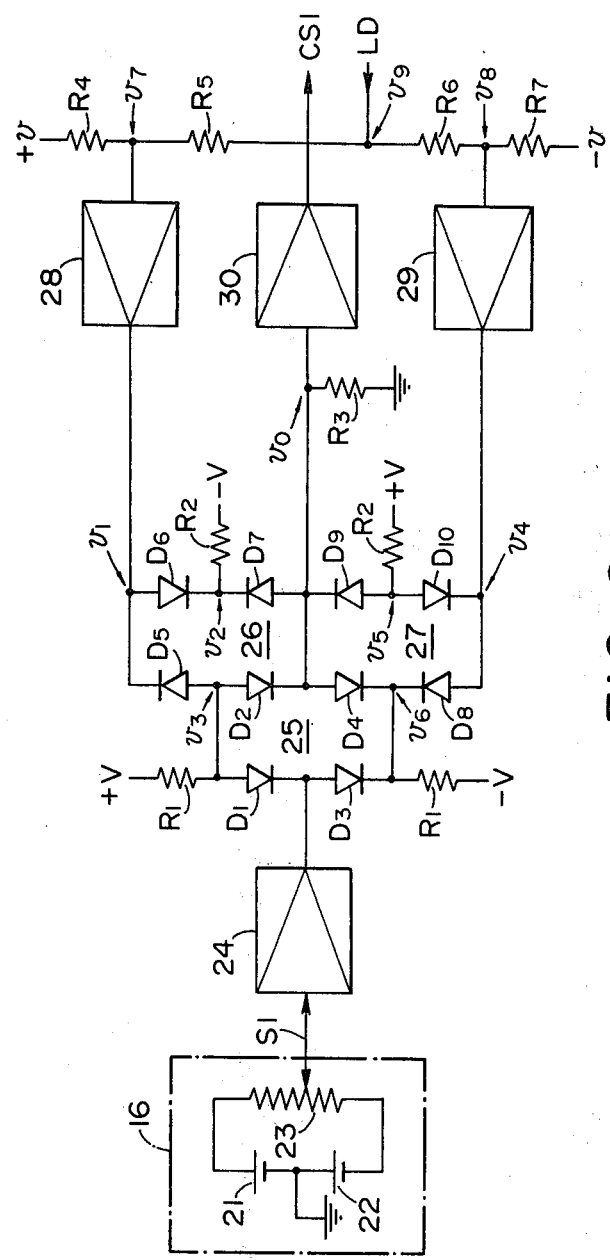
FIG. 2 is a block diagram of an embodiment of the speed limiting circuit used in the apparatus.

A preferred embodiment of lens driving apparatus of the invention is applied to a zoom lens unit, the overall arrangement of which is shown in FIG. 1 and an example of the speed limiting circuit part thereof is shown in FIG. 2.

Referring first to FIG. 1, the zoom lens unit is composed of a focusing lens 1, a variator lens 2, a compensator lens 3 and a relay lens 4. Of the four zoom components, the variator lens 2 and compensator lens 3 are moving lenses and are mounted movably within a translation cam tube 7 through slide members 5 and 6 respectively. Designated by 8 is a rotation cam tube having a cam slot. The translation cam tube also has a cam slot. Through these cam slots and the slide members 5 and 6 which may be, for example, ball bearings, the moving lenses 2 and 3 are shifted axially as desired. To this end, the rotation cam tube 8 has a gear 9 fixed on its outer circumferential surface. The gear 9 is in mesh with a driving gear 11 through an intermediate gear 10. The driving gear 11 is connected with a servo-motor 12. The gear 9 is also in mesh with a gear 13 which is in turn connected with a potentiometer 14.

With the above arrangement, the lenses 2 and 3 are moved axially as the rotation cam tube 8 is rotated by the servo-motor 12. During the movement of the lenses 2 and 3, a position detection signal LD informing of the shift in position of the lenses 2 and 3 is continuously issued from the potentiometer 14.

Designated by 15 is a speed control circuit which receives two inputs, that is, the position detection signal LD from the potentiometer and a speed instruction signal SI from a zoom demand 16. The speed instruction signal SI is controlled by the position detected signal LD and a modified speed instruction signal CSI is issued from the speed control circuit 15. The speed instruction signal CSI drives an output amplifier 17 to control the speed of the servo-motor 12. By the way, when it is desired to drive the focusing lens 1, it may be done by driving its helicoid mechanism by means of the servo-motor 12.

Now, the manner of speed control by the above speed control circuit 15 is described in detail with reference to FIG. 2.

In FIG. 2, the zoom demand 16 comprises two voltage sources 21 and 22 connected in series and a potentiometer 23 connected to the ends of the two voltage sources. From the variable terminal of the potentiometer 23 there is derived, as the above described speed instruction signal SI, a variable voltage in either direction of positive and negative which is representative of the moving speed and moving direction of the moving lenses.

This speed instruction signal is applied to a variable voltage limiting circuit 25 through an amplifier 24. In case that the level of the signal SI is higher than a predetermined level which has been preset at the limiting circuit 25, the latter limits the level of signal SI to the predetermined level. On the contrary, in case that the level of the speed instruction signal SI is lower than the preset value, then the limiting circuit 25 allows the signal SI to pass through it. Therefore, the signal SI appears at the output of the circuit 25 as it is. In this manner, according to the invention, even when the speed instruction signal has once been set to a level over the predetermined level erroneously, the moving speed can be limited always to the predetermined level. Danger of the moving lenses being driven at an undesirably high speed can be eliminated completely and there is always a safe movement of lenses.

In the embodiment shown in FIG. 2, the variable voltage limiting circuit 25 is formed as a diode variable limiter circuit and is commposed of diodes $D_1$ to $D_4$ and resistances $R_1$ to $R_3$. The output of amplifier 24 is applied to the mid-point between the series-connected diodes $D_1$ and $D_3$ which are in parallel with other series-connected diodes $D_2$ and $D_4$. From the connection point between the diodes $D_2$ and $D_4$ an output voltage $v_0$ is taken up through resistance $R_3$ one terminal of which is connected to ground. To one terminal of the series-parallel circuit consisting of diodes $D_1$ to $D_4$ there is applied a maximum speed limiting voltage $+V$ and to the other terminal thereof there is applied also a maximum speed limiting voltage $-V$ through resistances $R_1$ and $R_1$ respectively.

Furthermore, the variable voltage limiting circuit 25 is connected to a positive side limiter circuit 26 and a negative side limiter circuit 27 to limit the output voltage $v_0$ depending upon the position detection signal LD in a manner as will be described later.

The positive side limiter circuit 26 includes diodes $D_2$ and $D_5$ to $D_7$ and resistance $R_2$. Diodes $D_2$ and $D_5$ are connected in series and $D_6$ and $D_7$ are connected in series. The first series-connected diodes $D_2$ and $D_5$ are in parallel to the second ones $D_6$ and $D_7$. To the connection point between the diodes $D_5$ and $D_6$ there is applied voltage $v_1$ by an amplifier 28 and to the connection point between $D_6$ and $D_7$ there is applied voltage $-V$ through resistance $R_2$.

Similarly, the negative side limiter circuit 27 includes diodes $D_4$ and $D_8$ to $D_{10}$ and resistance $R_2$. Diodes $D_4$ and $D_8$ in series are parallel-connected to diodes $D_9$ and $D_{10}$ in series. Voltage $v_4$ is applied to the connection point between $D_8$ and $D_{10}$ from an amplifier 29 and voltage $+V$ is applied to the connection point between $D_9$ and $D_{10}$ through the resistance $R_2$.

Between voltages $+V$ and $-V$ there are connected resistances $R_4$, $R_5$, $R_6$ and $R_7$ in this order and the position detection signal LD is applied to the connection point between $R_5$ and $R_6$. For the purpose of explanation, it is assumed that when the voltage of position detection signal LD is $v_9$, the voltage at the connection point between $R_4$ and $R_5$ becomes $v_7$ and that at the connection point between $R_6$ and $R_7$ becomes $v_8$. These voltages $v_7$ and $v_8$ represent detection voltages of positions selected within the given lens moving distance range. For example, in case of a zoom lens, voltage $v_7$ is detection voltage of wide-side end and $v_8$ is that of tele-side end position. The voltages $v_7$ and $v_8$ are applied to amplifiers 28 and 29 respectively. As the voltage $v_9$ of position detection signal LD approaches the predetermined position in the given moving range at the negative side, the voltage $v_7$ gradually goes near to zero (0). On the other hand, as the voltage $v_9$ approaches the predetermined position at the positive side, the voltage $v_8$ gradually goes near to zero (0).

The above mentioned output voltage $v_0$ taken from resistance $R_3$ is applied to amplifier 30 to get a controlled speed instruction signal CSI. Then, the output CSI is applied to the servo-motor 12 through the output amplifier 17 (FIG. 1).

Here, let the voltage at the connection point between diodes $D_5$ and $D_2$ be $v_3$, that between $D_6$ and $D_7$ be $v_2$, that between $D_4$ and $D_8$ be $v_6$ and that between $D_9$ and $D_{10}$ be $v_5$, then $v_1 > v_3$ and $v_4 < v_6$ at the time when it is detected by the position detection signal LD that the moving lenses are at a position inward between the both ends of the movement limiting areas.

Therefore, in this instance, all of diodes $D_5$, $D_7$, $D_8$ and $D_9$ are counter-biased and become cut off. Namely, limiter circuits 26 and 27 are cut off from the variable voltage limiting circuit 25. At this time, speed instruction signal SI passes through the amplifier 24 and the signal is voltage-limited by resistance $R_1$ and diodes $D_1$ to $D_4$. The limiting voltage $v_0$ by which the signal SI is limited at that time is given by:

$$v_0 = \pm \frac{(V - V_F)R_3}{R_1 + R_3}$$

wherein, $V_F$ is the forward voltage of diode.

In case that the speed instruction signal SI is not higher than the above limiting voltage, then the signal SI is taken up as output voltage $v_0$ as it is, In this manner, a speed instruction signal SI can be put out, as it is, from the amplifier 30 as a final speed instruction output so long as the level of the signal SI is under the limiting voltage level. As the position detection signal LD approaches the predetermined position, the limiting voltage $v_1$ or $v_4$ produces a voltage proportional to the detected lens position. Since $v_1$ is a positive voltage and $v_4$ is negative, diode $D_6$ or $D_{10}$ is on at this time and therefore voltage $v_0 - v_1$ is applied to diode $D_7$ whereas voltage $v_4 - v_0$ is applied to diode $D_9$.

When it turns to $v_0 > v_1$ or $v_4 > v_0$, diode $D_7$ or $D_9$ becomes conductive and the output voltage $v_0$ is subjected to voltage limitation by limiting voltage $v_1$ or $v_4$.

When the moving lenses go on further, there may occur such case where the moving lenses slightly exceed the predetermined position or where the lenses already stopped by the speed instruction signal which was forcedly made zero (0) become inclined and deviated slightly beyond the predetermined position due to their own weight. In such case, on the wide side, the voltage $v_1$ becomes negative and consequently there is produced, as the output voltage $v_0$, a negative voltage, that is, an inversed signal which serves to move the lenses back. Similarly, on the tele side, the voltage $v_4$ becomes positive and consequently there is produced, as the output voltage $v_0$, a positive voltage which serves to rotate the servo-motor in the opposite direction. Thus, according to the invention, whenever the moving lenses are about to exceed the predetermined position within the allowable distance range of movement, a speed instruction output CSI for reversal of rotation is generated at once to move the lenses back. Therefore, it never happens that the moving lenses stop at a position beyond the predetermined position.

For example, the positive side limiter circuit operates as follows:

As the voltage $v_9$ of position detection signal LD approaches the limiting area at the negative side, the voltage $v_7$ gradually approaches zero (0). This voltage $v_7$ is amplified through the amplifier 28 and becomes voltage $v_1$. The voltage $v_1$ can not have any effect on voltage $v_0$ so long as $$v_1 \geq \frac{(V - V_F)R_3}{R_1 + R_3}$$

because of diodes $D_5$ and $D_7$ being counter-biased. However, when it gets in the condition of $$v_1 < \frac{(V - V_F)R_3}{R_1 + R_3},$$

the output voltage $v_0$ is limited by the voltage $v_1$ and therefore the maximum value of $v_0$ is limited to $v_1$. When the moving lenses come closer to the limiting area, the voltage $v_1$ becomes zero (0) and when they exceed the limiting area, it produces a negative voltage. Therefore, as far as the servo system is concerned, its convergence to 0 (zero) is finished within the limiting area.

As understood from the foregoing, the present invention enables the driving of the lens or lenses very smoothly and without noise. In the area between the start point and a point near the predetermined position, the moving lenses are driven at a constant speed without exceeding a safe speed limit. When the moving lenses approaches the predetermined position, there is produced a speed limiting voltage the level of which is proportional to the distance from the predetermined position. The moving speed of the lenses is limited by this limiting voltage. Further, if the moving lenses exceed the predetermined position, then a reversed moving speed instruction is issued to move the lenses back. In this manner, according to the invention, the stop point of the moving lenses is automatically determined irrespective of whether the speed instruction signal is large or small. Furthermore, since the speed of the moving lenses is gradually decreased, mechanical inertia can be absorbed by the servo system and no mechanical vibration and noise may be generated. As a whole, a smooth and noiseless lens driving can be assured.

While the present invention has been particularly shown and described with reference to an electromotor zooming for a zoom lens, the application of the present invention is never limited to it only. The present invention is equally applicable to other various moving lenses such as that for electromotor focusing without losing the effect of the invention. Further, while in the above embodiment the lens driving members have been shown to be a rotation cam tube, translation cam tube and helicoid mechanism, it should also be understood that the present invention is applicable to other types of driving mechanism such as that using gears. The scope of the invention is therefore to be determined solely by the appended claims.

What I claim is:

1. A lens driving device for moving at least one movable lens of a lens system up to an end of a path of movement by a servo-motor, comprising:
    a mechanism for moving said at least one movable lens;
    a servo-motor operatively connected to said mechanism to move said at least one movable lens;
    a speed demand signal generator for generating a direct current voltage signal corresponding to a demanded moving speed and a demanded moving direction;
    position detection means for generating a position detection signal corresponding to the position of said at least one movable lens;
    a comparator for comparing the output of said position detecting means with a fixed signal representing the end of the path of movement and for generating a signal representing the difference therebetween; and
    switching means for supplying the direct current signal of said speed demand signal generator to said servo-motor until said at least one movable lens reaches a predetermined position adjacent but before the said end, and for supplying the output of said comparator to said servo-motor after said at least one movable lens has reached the predetermined position so that said at least one movable lens approaches and reaches the end without any influence from said speed demand signal generator.

2. A lens driving device according to claim 1, wherein said lens system is a zoom lens system and said movable lenses are a variator lens and a compensator lens.

* * * * *